United States Patent
Fujii et al.

(10) Patent No.: US 8,750,005 B2
(45) Date of Patent: Jun. 10, 2014

(54) POWER CONVERSION APPARATUS

(71) Applicant: Toshiba Mitsubhish-Electric Industrial Systems Corporation, Tokyo (JP)

(72) Inventors: Yosuke Fujii, Tokyo (JP); Eiichi Ikawa, Tokyo (JP); Tatsuaki Amboh, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/774,347

(22) Filed: Feb. 22, 2013

(65) Prior Publication Data
US 2013/0163301 A1    Jun. 27, 2013

Related U.S. Application Data

(63) Continuation of application No. PCT/JP2010/064191, filed on Aug. 23, 2010.

(51) Int. Cl.
*H02M 7/537* (2006.01)

(52) U.S. Cl.
USPC ............................................ 363/98; 363/132

(58) Field of Classification Search
USPC ................................. 363/95, 97, 98, 131, 132
See application file for complete search history.

(56) References Cited

U.S. PATENT DOCUMENTS

| | | | |
|---|---|---|---|
| 8,144,490 B2 * | 3/2012 | El-Barbari et al. | 363/43 |
| 2010/0039843 A1 | 2/2010 | Takizawa | |

FOREIGN PATENT DOCUMENTS

| JP | 8-137563 | 5/1996 |
|---|---|---|
| JP | 2002-218762 | 8/2002 |
| JP | 2002-247862 | 8/2002 |
| JP | 2006-304530 | 11/2006 |
| JP | 2008-193779 | 8/2008 |
| WO | WO 2010/013322 A1 | 2/2010 |
| WO | WO 2010/044164 A1 | 4/2010 |

OTHER PUBLICATIONS

English-language International Search Report from the Japanese Patent Office in International Application No. PCT/JP2010/064191 mailed Nov. 16, 2010.
International Preliminary Report on Patentability and Written Opinion issued by the International Bureau of WIPO on Mar. 19, 2013, for International Application No. PCT/JP2010/064191.

* cited by examiner

*Primary Examiner* — Gary L Laxton
*Assistant Examiner* — Kyle J Moody
(74) *Attorney, Agent, or Firm* — Finnegan, Henderson, Farabow, Garrett & Dunner, LLP

(57) ABSTRACT

A power conversion apparatus includes a comparison circuit which compares a determination element related to a loss in the power converter with a switching reference value and outputs a determination instruction when a difference has occurred between them, a determination circuit which outputs a two-level operation switching instruction when the determination element is greater than or equal to the switching reference value, and a switching circuit which, when having received a two-level operation switching instruction, turns off the alternating-current switch and turns on the valve devices in the arm sequentially, thereby bringing the power converter into a two-level operation state.

6 Claims, 8 Drawing Sheets

| Switching signal | IGBT element ON, OFF instruction 1 : ON, 0 : OFF | | | |
|---|---|---|---|---|
| 1 : 3-level operation 0 : 2-level operation | Sw1 | Sw2 | Sw3 | Sw4 |
| 1 | 1 | 0 | 1 | 0 |
| 1 | 0 | 0 | 1 | 0 |
| 1 | 0 | 1 | 1 | 0 |
| 1 | 0 | 1 | 0 | 0 |
| 1 | 0 | 1 | 0 | 1 |
| 1 | 0 | 1 | 0 | 0 |
| 1 | 0 | 1 | 1 | 0 |
| 1 | 0 | 0 | 1 | 0 |
| 1 | 1 | 0 | 1 | 0 |
| 0 | 1 | 0 | 0 | 0 |
| 0 | 0 | 0 | 0 | 0 |
| 0 | 0 | 0 | 0 | 1 |
| 0 | 0 | 0 | 0 | 0 |

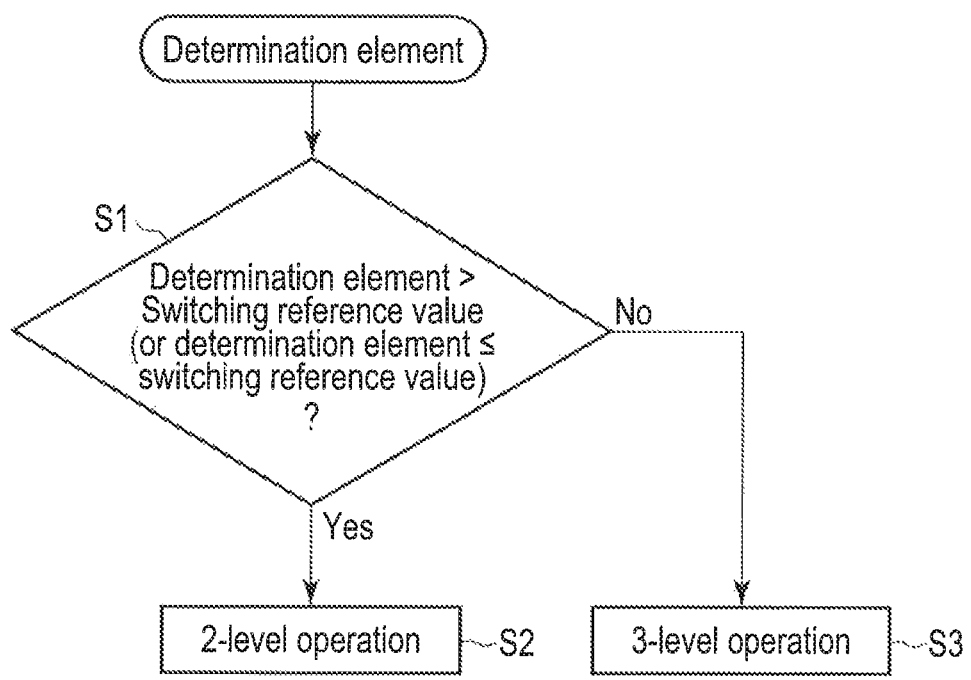
F I G. 4

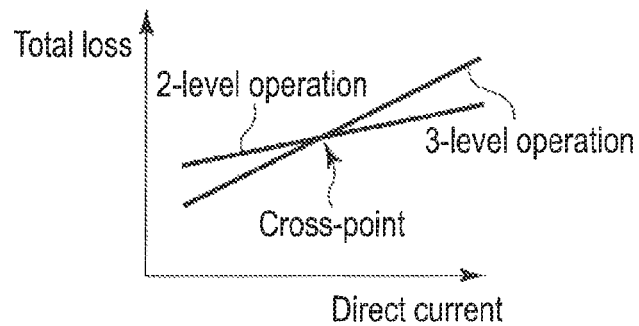
F I G. 5A
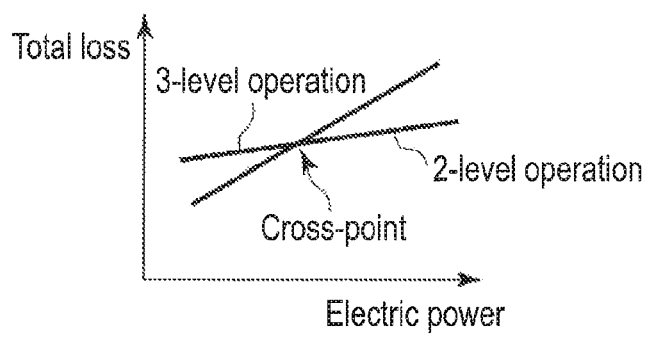
F I G. 5B
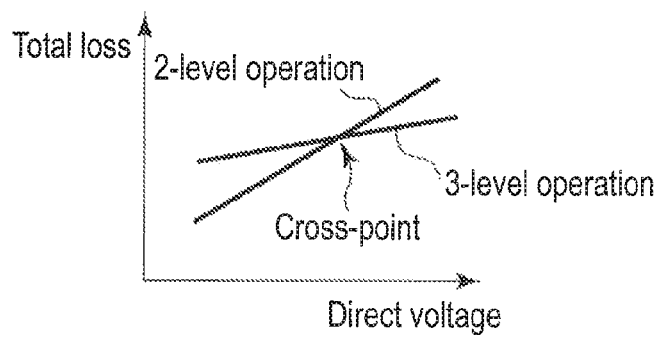
F I G. 5C

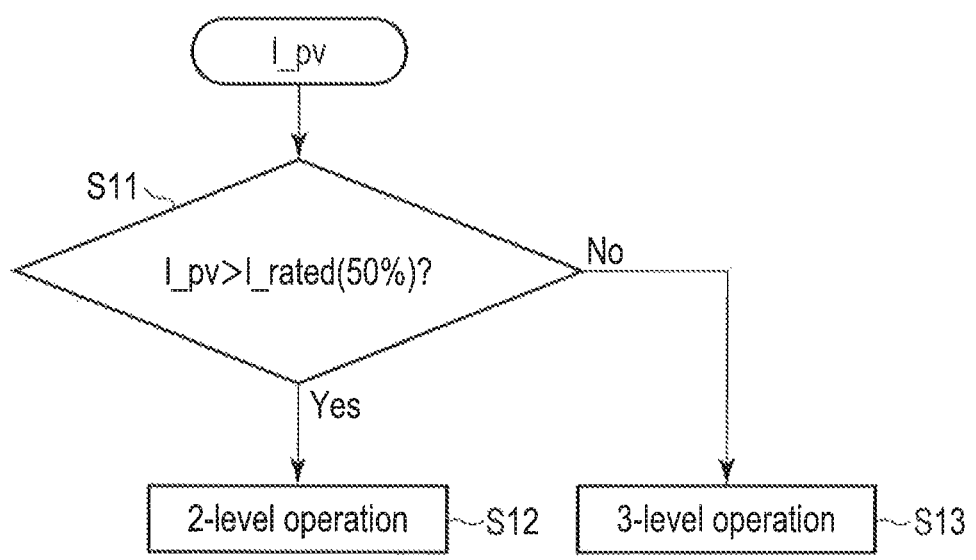
F I G. 7

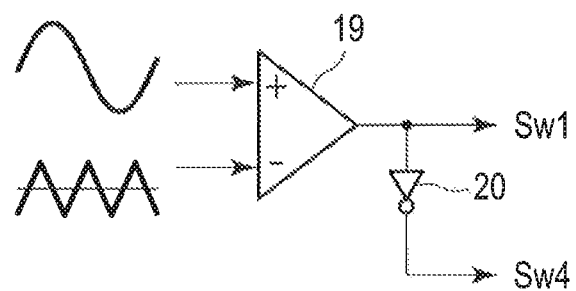
F I G. 8A
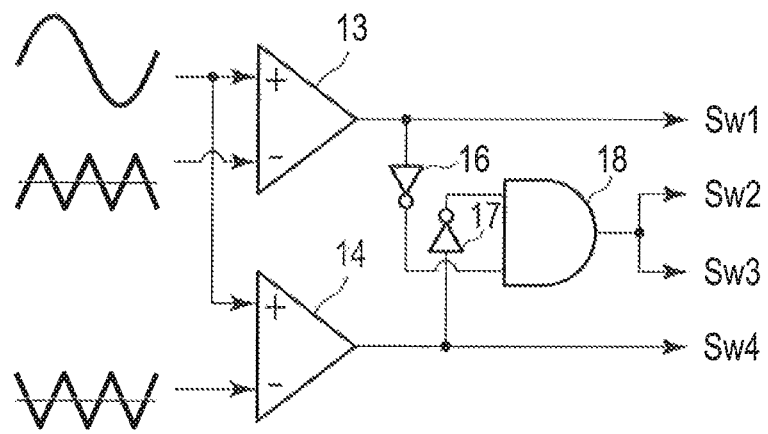
F I G. 8B

POWER CONVERSION APPARATUS

CROSS-REFERENCE TO RELATED APPLICATIONS

This application is a Continuation Application of PCT Application No. PCT/JP2010/064191, filed Aug. 23, 2010, the entire contents of which are incorporated herein by reference.

BACKGROUND OF THE INVENTION

1. Field of the Invention

Embodiments described herein relates generally to a power conversion apparatus that produces alternating-current power from direct-current power and to a power conversion apparatus that produces direct-current power from alternating-current power, such as a photovoltaic power generation system, a fuel-cell power generation system, or a secondary-cell energy storage system.

2. Description of the Related Art

In a photovoltaic power generation system, a power conversion apparatus generally converts direct-current power generated by photovoltaic cells into alternating-current power and supplies the alternating-current power to a linked system such as a power system, a distribution system, and a load. Since the characteristics of the photovoltaic cells vary, depending on insolation or temperature conditions, a maximum power point tracking method has been employed to constantly obtain the maximum power. For example, as disclosed in patent document 5, the voltage or current of a photovoltaic cell is controlled to the optimum point at which the voltage or current varies, depending on insolation or temperature conditions.

As for a circuit configuration of a power conversion apparatus, use of a multilevel conversion circuit, such as a three-level inverter as shown in patent documents 1, 3 and 4, suppresses harmonic currents in an input and an output and realizes the miniaturization of filters provided at the input and output and an improvement in the efficiency of the apparatus.

Furthermore, patent document 2 has described the comparison between conduction losses and switching (SW) losses in a three-level inverter and a two-level inverter.

PRIOR ART DOCUMENT

Patent Document

Patent Document 1: Jpn. Pat. Appln. KOKAI Publication No. 2002-216762
Patent Document 2: WO2010/013322A1
Patent Document 3: Jpn. Pat. Appln. KOKAI Publication No. 2002-247862
Patent Document 4: Jpn. Pat. Appln. KOKAI Publication No. 2006-304530
Patent Document 5: Jpn. Pat. Appln. KOKAI Publication No. 8-13763

In patent documents 1, 3, 4, although use of a three-level inverter (neutral clamp, AC switch) circuit has achieved the miniaturization of filters and the reduction of the total loss, it is presumed that the inverter circuit should be optimally designed under conditions that the direct-current voltage is constant and the output is constant. Neither variable direct-current voltage nor variable power has been particularly referred to. The configuration of a three-level inverter (including other levels) leads to an increase in the number of elements used and to an increase in the conduction loss, causing demerits at the time of a low direct-current voltage (or a high output) when the effect of an SW loss ripple is small. No concrete solution to the demerits has been provided.

BRIEF SUMMARY OF THE INVENTION

It is an object of the present invention to provide a power conversion apparatus which is operated under conditions that a direct-current voltage is variable, an alternating-current output is variable, or both a direct-current voltage and an alternating-current output are variable and achieves a smaller loss and an improved efficiency even if the direct-current voltage or the alternating-current output varies.

In order to achieve the object, the invention corresponding to claim 1 provides a power conversion apparatus comprising: first and second direct-current power supplies connected in series; and a power converter that converts direct-current power from each of the power supplies into alternating-current power and supplies the alternating-current power to an alternating-current power system, the power converter being so configured that at least two valve devices constituted of semiconductor elements are connected in series to constitute one arm, at least three units of this arm are connected in parallel, an alternating-current switch constituted of a series connection of at least two valve devices each constituted of a semiconductor element, and a diode connected in inverse parallel with the semiconductor element is connected between a connection point of the valve devices and a connection point of the direct-current power supplies in each arm, and each of the alternating-current switches is turned on or off, thereby enabling the power converter to perform three-level operation or two-level operation, the power conversion apparatus further comprising: a comparison circuit which compares a determination element related to a loss in the power converter with a switching reference value and outputs a determination instruction when a difference has occurred between the determination element and the switching reference value; a determination circuit which determines whether the determination element is greater or less than the switching reference value when having received a determination instruction from the comparison circuit, and outputs a two-level operation switching instruction when the determination element is greater than or equal to the switching reference value; and a switching circuit which, when having received a two-level operation switching instruction from the determination circuit, turns off the alternating-current switch and turns on the valve devices in the arm sequentially, thereby bringing the power converter into a two-level operation state.

In order to achieve the object, the invention corresponding to claim 5 provides a power conversion apparatus comprising: first and second direct-current power supplies to which direct-current energy from photovoltaic cells is input and which are connected in series; and a power converter that converts direct-current power from each of the power supplies into alternating-current power and supplies the alternating-current power to an alternating-current power system, the power converter being so configured that at least two valve devices constituted of semiconductor elements are connected in series to constitute one arm, at least three units of this arm are connected in parallel, an alternating-current switch constituted of a series connection of at least two valve devices each constituted of a semiconductor element and a diode connected in inverse parallel with the semiconductor element is connected between a connection point of the valve devices and a connection point of the direct-current power supplies in each arm, and each of the alternating-current switches is turned on or off, thereby enabling the power converter to perform three-level operation or two-level operation, the power conversion apparatus further comprising: a comparison circuit which compares direct current from the photovoltaic cells based on the amount of insolation with rated current and outputs an operation determination output when a difference has occurred between the direct current and the rated current; a determination circuit which, when having received an determination instruction, outputs a two-level operation switching instruction if the direct current from the photovoltaic cells is greater than or equal to 50% of the rated current; and a switching circuit which, when having received a two-level operation switching instruction from the determination circuit, turns off the alternating-current switch and turns on the valve devices in the arm sequentially, thereby bringing the power converter into a two-level operation state.

According to the present invention, it is possible to provide a power conversion apparatus which is operated under conditions that a direct-current voltage is variable, an alternating-current output is variable, or both a direct-current voltage and an alternating-current output are variable and which selects a most suitable operating method (two-level/three-level), thereby achieving a smaller loss and an improved efficiency even if the direct-current voltage or the alternating current output varies.

BRIEF DESCRIPTION OF THE SEVERAL VIEWS OF THE DRAWING

FIG. 4 is a flowchart to explain a first example of a determination circuit of FIG. 2;

FIG. 5A is a diagram to explain a first example of a comparison circuit of FIG. 2;

FIG. 5B is a diagram to explain a second example of the comparison circuit of FIG. 2;

FIG. 5C is a diagram to explain a third example of the comparison circuit of FIG. 2;

FIG. 7 is a flowchart to explain a third example of a determination circuit of FIG. 2;

FIG. 8A is a diagram to explain a second example of the PWM switching circuit of FIG. 1;

FIG. 8B is a diagram to explain a third example of the PWM switching circuit of FIG. 1;

DETAILED DESCRIPTION OF THE INVENTION

Embodiments will be described with reference to the drawings.

Figure 1:
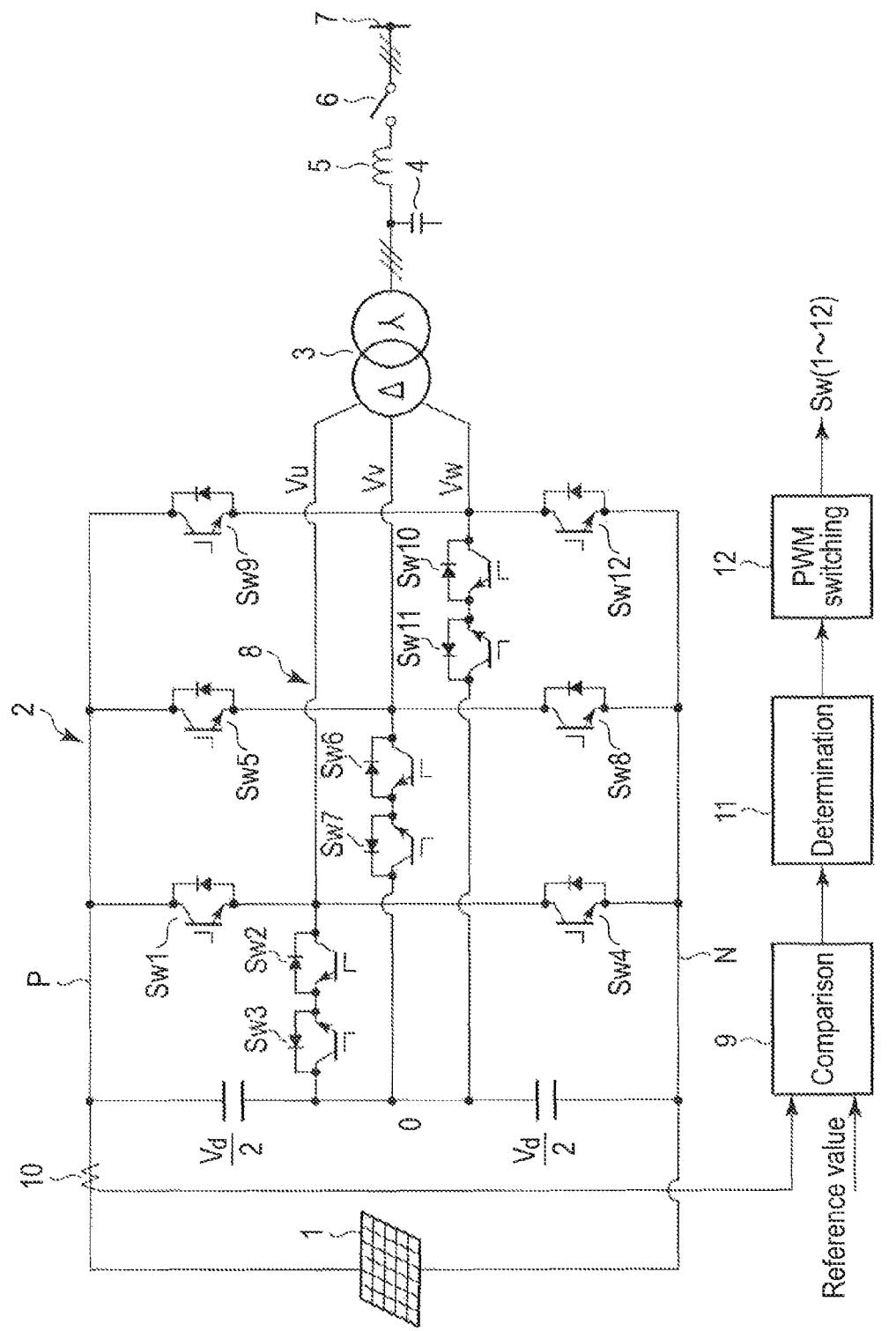
FIG. 1 schematically shows a main circuit of a power conversion apparatus according to the invention.

FIG. 1 is a main circuit diagram of a power conversion apparatus of the invention. The power conversion apparatus is so configured that direct-current power of a direct-current power supply, such as photovoltaic cells 1, is converted into alternating-current power by a power converter, such as a three-phase inverter 2, and the converted alternating-current power is stepped up by a transformer 3 and supplied to an alternating-current power system 7 via a capacitor 4, a reactor 5, and a switch 6.

The inverter 2 is so configured that six units of a valve device SW constituted of a semiconductor element, such as an IGBT element, and a diode connected in inverse parallel with the element are bridge-connected in such a manner that SW1-SW4, SW5-SW8, and SW9-SW12 each constitute a three-phase arm and that a circuit of a series connection of capacitors Vd/2, Vd/2 is connected in parallel with the photovoltaic cells 1 side, the input side of the three-phase arms, and that six units of a valve device SW constituted of, for example, an IGBT element and a diode connected in inverse parallel with the element are connected to the middle point of the capacitors in such a manner that series-connected valve device groups SW2-SW3, SW6-SW7, SW10-SW11 each are connected to the middle point. The valve device groups constitute a neutral AC switch system.

In FIG. 1, for example, valve devices SW2 and SW3, SW6 and SW7, and SW10 and SW11 are turned off, making the inverter equivalent to a general two-level inverter. In addition, switching between SW1 to SW4, SW5 to SW8, and SW9 to SW12 arbitrarily enables the inverter to function as a three-level inverter.

According to the present invention, a comparison circuit 9, a determination circuit 11, and a PMW switching circuit 12 described later are newly added to the above configuration.

In a first example of the comparison circuit 9, a direct current detector 10 detects direct current flowing from the photovoltaic cells 1 to the inverter 2 as a determination element. The detected current is input to one input terminal of the comparison circuit 9. The comparison circuit 9 compares the detected current with a switching reference value input to the other input terminal of the comparison circuit 9.

Here, a switching reference value can be found by storing previous data in a database or the like and changing another element with some element fixed, or by using calculation results or simulations.

The determination circuit 11 takes in the comparison result from the comparison circuit 9, makes a determination of S1 as shown in FIG. 4 as a first example, that is, determines on a determination element related to a loss in the power converter, for example, determines whether direct current detected by the direct current detector 10 is greater than or equal to the switching reference value (or direct current is less than the switching reference value) and, if having determined that the direct current is greater than or equal to the switching reference value, determines on two-level operation in S2 and, if having the direct current is less than the switching reference value, determines on three-level operation in S3.

Figures 2, 3:
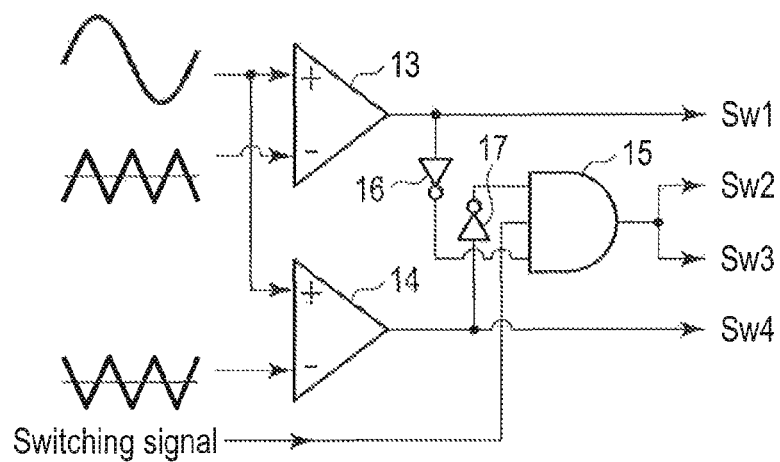
FIG. 2 is a diagram to explain a first example of a PWM switching circuit of FIG. 1.
FIG. 3 is a diagram to explain an operation of FIG. 2.

As a first example as shown in FIG. 2, the PMW switching circuit 12 comprises two comparators 13, 14 and a three-terminal input AND gate 15, and inverters 16, 17. A sine wave (signal wave) is input to the positive input terminals of the comparators 13, 14 and a carrier wave (modulation wave) is input to the negative input terminals of the comparators 13, 14. Two input terminals of the AND gate 15 are connected via the inverters 16, 17 to the output terminals of the comparators 13, 14. A switching signal is input to one input terminal of the AND gate 15. A signal from the output terminal of the AND gate 15 is supplied to valve devices SW2 and SW3. The output of the comparator 13 is supplied to valve device SW1. The output of the comparator 14 is supplied to valve device SW4.

FIG. 3 shows the switching signals of FIG. 2 and the output signals of FIG. 2.

The aforementioned PMW switching circuit 12 corresponds to one arm (one phase) of the main circuit. Other two arms (two phases) of the main circuit are configured in the same manner.

Operational advantages of the aforementioned embodiment will be explained. Direct current, output current of the photovoltaic cells 1, is detected by the current detector 10. The detected current is input to the comparison circuit 9, which compares the detected current with the reference value. If there is a difference between them, the determination circuit 11 determines whether a determination element shown in S1 is less or greater than the switching reference value and then determines at a cross-point in FIG. 5A whether two-level operation or three-level operation should be activated. The determination result of the determination circuit 11 is input to the PWM switching circuit 12. The PWM switching circuit 12 supplies on "1" or off "0" to valve devices SW1 to SW12 as shown in FIG. 3. When valve device groups SW2-SW3, SW6-SW7, SW10-SW11 constituting the neutral AC switch are on three-level operation is activated. When valve device groups SW2-SW3, SW6-SW7, SW10-SW11 are off, two-level operation is activated.

As a result, when the direct current is less than or equal to the switching reference value, three-level operation is activated. When the direct current is greater than the switching reference value, two-level operation is activated. Therefore, of three-level operation and two-level operation, the one with higher conversion efficiency is selected and activated for power conversion.

Here, a loss in the power converter in two-level operation and three-level operation, specifically, a conduction loss and a switching loss (SW loss), will be explained. A conduction loss is a loss caused while the power converter is turning on (or causing) a valve device conduct). The conduction loss depends on the magnitude of conducting current (direct current) in the same valve device. When two-level operation is compared with three-level operation, two-level operation with the number of valve devices in one arm being smaller is preferred over three-level operation in terms of a conduction loss.

A switching loss (SW loss) is a loss caused when the power converter turns on and off a valve device. The switching loss depends on the magnitude of a voltage (direct-current voltage) applied to the same valve device. When two-level operation is compared with three-level operation, three-level operation with the number of times each valve device performs switching being smaller is preferred over two-level operation.

With the above embodiment, a power conversion apparatus with a lower loss and an improved efficiency can be provided by selecting a best operation system (two-level/three-level) even if a direct-current voltage or an alternating-current output varies in a power converter that is operated under conditions that the direct current is variable, the alternating-current power is variable, or both the direct current and the alternating-current output are variable.

Next, a second embodiment of the invention will be explained. While the above embodiment, direct current detected by the direct current detector 10 has been used as a determination element of FIG. 4, direct current power is used in place of this as shown in FIG. 5B. This is a case where direct-current power obtained on the basis of direct-current voltage detected by a direct-current voltage detector (not shown) and direct current detected by the direct current detector 10 of FIG. 1 is used as a determination element.

A third embodiment of the invention will be explained. While the above embodiment, direct current detected by the direct current detector 10 has been used as a determination element of FIG. 4, direct-current voltage detected by a direct-current voltage detector (not shown) is used in place of this as shown in FIG. 5C.

In addition, a fourth embodiment of the invention will be explained. While the above embodiment, direct current detected by the direct current detector 10 has been used as a determination element of FIG. 4, an alternating-current power is used in place of this. In this case, detecting is performed by a current detector (not shown) that detects an alternating current in an inverter, a voltage detector (not shown) that detects an alternating-current voltage of the capacitor 4, a current detector (now shown) that detects current input to the power system 7, and the like. Alternating-current power is calculated from these detected values. What corresponds to a loss obtained by subtracting the calculated alternating-current power from direct-current power on the input side of the inverter is used as a determination element in this case, too, the determination circuit 11 performs processing according to a flowchart as shown in FIG. 4 as in the above embodiment.

FIG. 5B shows the relationship between direct-current power and a total loss in a two-level operation state and in a three-level operation state. FIG. 5C shows the relationship between direct-current voltage and a total loss in a two-level operation state and in a three-level operation state.

Figure 6:
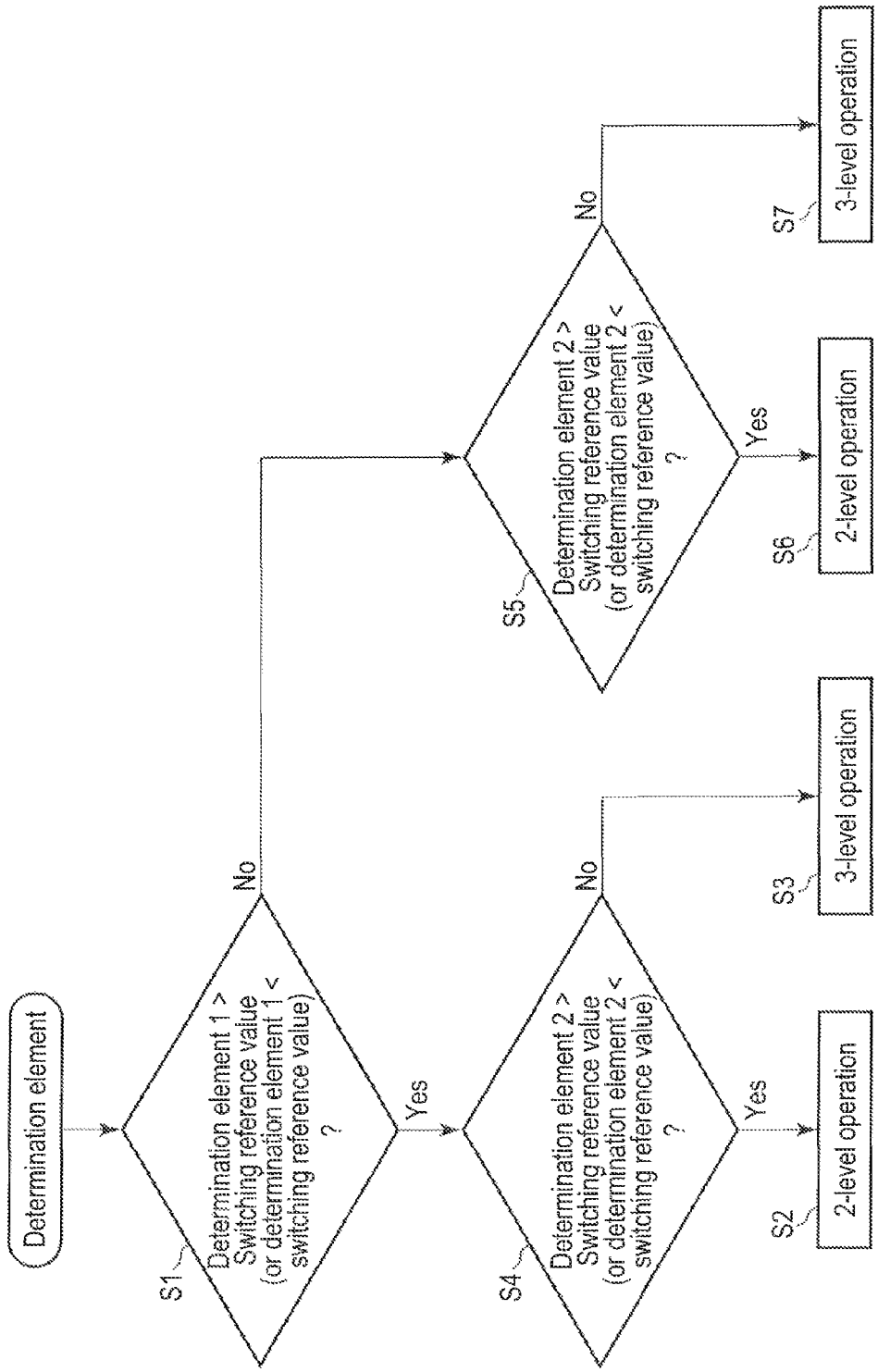
FIG. 6 is a flowchart to explain a second example of the determination circuit of FIG. 2.

Furthermore, a fifth embodiment of the invention will be explained. While the above embodiment, direct current detected by the direct current detector 10 has been used as a determination element of FIG. 4, instead of this, the direct current is used as a determination element 1 and the direct-current voltage is used as a determination element 2. The determination circuit 11 is configured to perform processing according to a flowchart in FIG. 6. In S1 of FIG. 6, if determination element 1>switching reference value is satisfied, control proceeds to S4. In S4, if determination element 2>switching reference value is satisfied, two-level operation (S2) is activated. In S4, if determination element 2>switching reference value is not satisfied, three-level operation (S3) is activated. In S1, if determination element 1>switching reference value is not satisfied, control proceeds to S5. In S5, if determination element 2>switching reference value is satisfied, two-level operation (S6) is activated. In S5, determination element 2>switching reference value is not satisfied, three-level operation (S7) is activated. Here, the reason why or determination element 1<switching reference value) has been written in S1 is that, if this expression is satisfied, control proceeds to S5 and, if the expression is not satisfied, control proceeds to S4. The reason why for determination element 2<switching reference value) has been written in S4 is that, if this expression is satisfied, control proceeds to S3 and, if the expression is not satisfied, control proceeds to S2. The reason why for determination element 2<switching reference value) has been written in S5 is that, if this expression is satisfied, control proceeds to S7 and, if the expression is not satisfied, control proceeds to S6.

In addition, arbitrary two of direct current, direct-current voltage, direct-current power, and alternating-current power may be selected as determination element 1 and determination element 2.

Next, a sixth embodiment of the invention will be explained with reference to a flowchart for a determination circuit 11 of FIG. 7. FIG. 7 shows a case of a power converter (power conditioner) in a photovoltaic cell system shown in FIG. 1. In S11, it is determined whether direct current of photovoltaic cells 1 based on the amount of insolation is greater than or equal to 50% of a rated current. In S11, if it has been determined that the direct current is greater than or equal to 50% of the rated current, two-level operation is determined to be activated. In addition, if it has been determined that the direct current is less than 50% of the rated current, three-level operation is determined to be activated.

In this case, too, a conduction loss and a switching loss in a valve device are calculated, thereby switching between two-level operation and three-level operation. Aside from this, if it has been determined that the input power of the power converter (power conditioner) is greater than or equal to 50% of a rated power, two-level operation may be activated. In addition, if it has been determined that the input power is less than 50% of the rated power, three-level operation may be activated.

FIGS. 8A and 8B each show a PWM switching circuit differing from that of FIG. 2. FIG. 8A shows an example of a two-level PWM switching circuit, which is constituted of a comparator 19 and an inverter 20. FIG. 8B shows an example of a three-level PWM switching circuit, which is constituted of comparators 13, 14, inverters 16, 17, and an AND gate 18. The functions of these are the same as in FIG. 2.

Figure 9A:
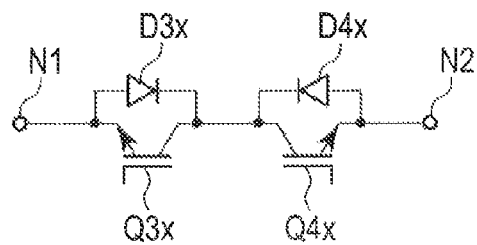
FIG. 9A is a diagram to explain a second example of a neutral AC switch of FIG. 1.

Although the valve device group constituting the aforementioned neutral AC switch has been explained, taking an IGBT element emitter-common system as an example, the following may be used FIG. 9A shows a collector common system where the collectors of two IGBT elements Q3$x$, Q4$x$ are connected to each other. Diodes D3$x$, D4$x$ may be connected in inverse parallel with IGBT elements Q3$x$, Q4$x$, respectively. In addition, terminal X1 to which the emitter of Q3$x$ and the anode of D3$x$ are connected may be connected to, for example, the neutral point of FIG. 1. Then, terminal X2 to which the emitter of Q4$x$ and the anode of D4$x$ are connected may be connected to, for example, the connection point of Sw1 and Sw4 of FIG. 1.

Figure 9B:
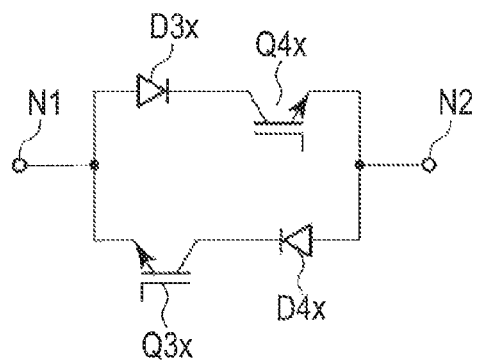
FIG. 9B is a diagram to explain a third example of the neutral AC switch of FIG. 1.
Figure 9C:
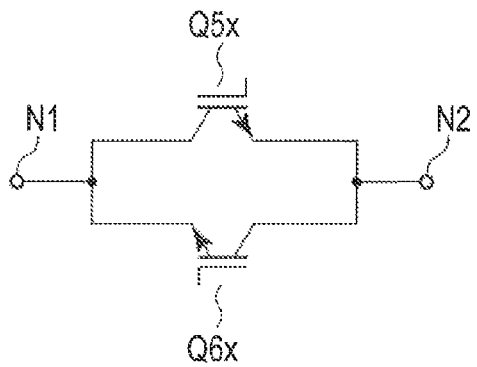
FIG. 9C is a diagram to explain a fourth example of the neutral AC switch of FIG. 1.

FIG. 9B shows a reverse blocking system where the emitter of IGBT element Q3$x$ is connected to the collector of IGB element Q4$x$ and the emitter of IGBT element Q4$x$ is connected to the collector of IGBT Q3$x$, in which diode D3$x$ is further connected to the connection point of the emitter of IGBT element Q3$x$ and the collector of IGBT element Q4$x$, and diode D4$x$ is further connected to the connection point of the emitter of IGBT element Q4$x$ and the collector of IGBT Q3$x$, thereby forming a modified reverse blocking system. In addition, terminal N1 to which the emitter of Q3$x$ and the anode of D3$x$ are connected may be connected to, for example, the neutral point of FIG. 1. Then, terminal X2 to which the emitter of Q4$x$ and the anode of D4$x$ are connected may be connected to, for example, the connection point of Sw1 and Sw4 of FIG. 1.

In FIG. 9O, two IGBT elements Q5$x$, Q6$x$ may be used. Then, terminal N1 to which the collector of Q5$x$ and the emitter of Q6$x$ are connected may be connected to, for example, the neutral point of FIG. 1 and terminal N2 to which the emitter of Q5$x$ and the collector of Q6$x$ are connected may be connected to, for example, the connection point of Sw1 and Sw4 in FIG. 1.

While in the above embodiment, the power converter has been explained, taking an inverter as an example, the power converter is not limited to an inverter. For example, a converter may be used as the power converter. In this case, too, the invention may be embodied similarly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion apparatus comprising:
first and second direct-current power supplies connected in series; and
a power converter that converts direct-current power from each of the power supplies into alternating-current power and supplies the alternating-current power to an alternating-current power system,
the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation,
the power conversion apparatus further comprising:
a comparison circuit which compares a determination element related to a loss in the power converter with a switching reference value and outputs a determination instruction when a difference has occurred between the determination element and the switching reference value;
a determination circuit which determines whether the determination element is greater or less than the switching reference value when having received a determination instruction from the comparison circuit, and outputs a two-level operation switching instruction when the determination element is greater than or equal to the switching reference value; and
a switching circuit which, when having received the two-level operation switching instruction from the determination circuit, turns off the alternating-current switch and, in each of the arms, turns on the first valve devices sequentially, thereby bringing the power converter into a two-level operation state.

2. A power conversion apparatus comprising:
first and second direct-current power supplies connected in series; and
a power converter that converts direct-current power from each of the power supplies into alternating-current power and supplies the alternating-current power to an alternating-current power system,
the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation, the power conversion apparatus further comprising:
a comparison circuit which uses direct current input to the power converter as a determination element, compares the determination element with a switching reference value, and outputs a determination instruction when a difference has occurred between the determination element and the switching reference value;
a determination circuit which determines whether the determination element is greater or less than the switching reference value when having received a determination instruction from the comparison circuit, and outputs a two-level operation switching instruction when the determination element is greater than or equal to the switching reference value; and
a switching circuit which, when having received the two-level operation switching instruction from the determination circuit, turns off the alternating-current switch and, in each of the arms turns on the first valve devices sequentially, thereby bringing the power converter into a two-level operation state.

3. A power conversion apparatus comprising:
first and second direct-current power supplies connected in series; and
a power converter that converts direct-current power from each of the power supplies into alternating-current power and supplies the alternating-current power to an alternating-current power system,
the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation,
the power conversion apparatus further comprising:
a comparison circuit which uses direct-current voltage applied to the power converter as a determination element, compares the determination element with a switching reference value and outputs a determination instruction when a difference has occurred between the determination element and the switching reference value;
a determination circuit which determines whether the determination element is greater or less than the switching reference value when having received a determination instruction from the comparison circuit, and outputs a two-level operation switching instruction when the determination element is greater than or equal to the switching reference value; and
a switching circuit which, when having received the two-level operation switching instruction from the determination circuit, turns off the alternating-current switch and, in each of the arms, turns on the first valve devices sequentially, thereby bringing the power converter into a two-level operation state.

4. A power conversion apparatus comprising:
first and second direct-current power supplies connected in series; and
a power converter that converts direct-current power from each of the power supplies into alternating-current power and supplies the alternating-current power to an alternating-current power system,
the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation,
the power conversion apparatus further comprising:
a comparison circuit which uses direct-current power from the direct-current power supply supplied to the power converter as a determination element, compares the determination element with a switching reference value and outputs a determination instruction when a difference has occurred between the determination element and the switching reference value;
a determination circuit which determines whether the determination element is greater or less than the switching reference value when having received a determination instruction from the comparison circuit, and outputs a two-level operation switching instruction when the determination element is greater than or equal to the switching reference value; and
a switching circuit which, when having received the two-level operation switching instruction from the determination circuit, turns off the alternating-current switch and, in each of the arms turns on the first valve devices sequentially, thereby bringing the power converter into a two-level operation state.

5. A power conversion apparatus comprising:
first and second direct-current power supplies to which direct-current energy from photovoltaic cells is input and which are connected in series; and
a power converter that converts direct-current power from each of the power supplies into alternating-current power and supplies the alternating-current power to an alternating-current power system,
the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation,
the power conversion apparatus further comprising:
a comparison circuit which compares direct current from the photovoltaic cells based on the amount of insolation with rated current and outputs an operation determination output when a difference has occurred between the direct current and the rated current;
a determination circuit which, when having received a determination instruction, outputs a two-level operation switching instruction if the direct current from the photovoltaic cells is greater than or equal to 50% of the rated current; and a switching circuit which, when having received the two-level operation switching instruction from the determination circuit, turns off the alternating-current switch and in each of the arms, urns on the first valve devices in the arm sequentially, thereby bringing the power converter into a two-level operation state.

6. A power conversion apparatus comprising:

first and second direct-current power supplies to which direct-current energy from photovoltaic cells is input and which are connected in series; and a power converter that converts direct-current power from each of the power supplies into alternating-current power and supplies the alternating-current power to an alternating-current power system, the power converter being so configured that at least two first valve devices constituted of first semiconductor elements are connected in series to constitute one arm, at least three of the arms are connected in parallel, an alternating-current switch constituted of a series connection of at least two second valve devices each constituted of a second semiconductor element and a diode connected in inverse parallel with the second semiconductor element is connected between a connection point of the first valve devices and a connection point of the direct-current power supplies, and each of the alternating-current switches is turned on or off, thereby enabling the power converter to perform three-level operation or two-level operation, the power conversion apparatus further comprising:

a comparison circuit which compares direct-current power from the photovoltaic cells based on the amount of insolation with rated direct-current power and outputs an operation determination output when a difference has occurred between the direct-current power from the photovoltaic cells and the rated direct-current power;

a determination circuit which, when having received a determination instruction, outputs a two-level operation switching instruction if the direct-current power from the photovoltaic cells is greater than or equal to 50% of the rated power; and a switching circuit which, when having received the two-level operation switching instruction from the determination circuit, turns off the alternating-current switch and, in each of the arms, turns on the first valve devices sequentially, thereby bringing the power converter into a two-level operation state.

\* \* \* \* \*

UNITED STATES PATENT AND TRADEMARK OFFICE
CERTIFICATE OF CORRECTION

PATENT NO. : 8,750,005 B2
APPLICATION NO. : 13/774347
DATED : June 10, 2014
INVENTOR(S) : Fujii et al.

Page 1 of 1

It is certified that error appears in the above-identified patent and that said Letters Patent is hereby corrected as shown below:

In the Claims

Claim 5, column 11, lines 7-8, change "switch and in each of the arms, urns on the first valve devices in the arm sequentially," to --switch and, in each of the arms, turns on the first valve devices sequentially,--.

Signed and Sealed this
Sixteenth Day of December, 2014

Michelle K. Lee
*Deputy Director of the United States Patent and Trademark Office*